United States Patent
Cookson

(10) Patent No.: US 6,591,365 B1
(45) Date of Patent: Jul. 8, 2003

(54) COPY PROTECTION CONTROL SYSTEM

(75) Inventor: Christopher J. Cookson, Los Angeles, CA (US)

(73) Assignee: Time Warner Entertainment Co., LP, Burbank, CA (US)

( * ) Notice: Subject to any disclaimer, the term of this patent is extended or adjusted under 35 U.S.C. 154(b) by 0 days.

(21) Appl. No.: 09/478,713

(22) Filed: Jan. 6, 2000

Related U.S. Application Data

(60) Provisional application No. 60/116,641, filed on Jan. 21, 1999.

(51) Int. Cl.⁷ .............................. H04L 4/30; H04B 1/66
(52) U.S. Cl. ..................... 713/176; 380/269; 380/54; 382/232
(58) Field of Search ................... 705/57, 58; 713/176; 382/100, 250, 232; 380/54, 269

(56) References Cited

U.S. PATENT DOCUMENTS

| | | | | |
|---|---|---|---|---|
| 5,613,004 A | * | 3/1997 | Cooperman et al. | 713/176 X |
| 5,636,292 A | * | 6/1997 | Rhoads | 382/282 |
| 5,671,389 A | * | 9/1997 | Saliba | 711/111 |
| 5,721,788 A | * | 2/1998 | Powell | 382/100 |
| 5,809,139 A | * | 9/1998 | Girod et al. | 380/202 |
| 5,822,432 A | * | 10/1998 | Moskowitz et al. | 380/54 X |
| 6,064,764 A | * | 5/2000 | Bhaskaran et al. | 382/100 |
| 6,334,187 B1 | * | 12/2001 | Kadono | 713/176 |

* cited by examiner

*Primary Examiner*—Gilberto Barron, Jr.
(74) *Attorney, Agent, or Firm*—Gottlieb, Rackman & Reisman, P.C.

(57) ABSTRACT

A system for protecting against use of pirated music. Two watermarks are inserted into the music to be protected by the music publisher. One watermark is robust—it will not be destroyed by compression. The other watermark is weak—it is designed to be destroyed by compression. The robust mark tells a player that the music is protected, i.e., that it is not authorized to be delivered in compressed form over an insecure channel. If the music is found to have been compressed and it was delivered over an insecure channel, then its play or other processing can be restricted.

25 Claims, 8 Drawing Sheets

COPY PROTECTION CONTROL SYSTEM

This application claims the benefit of U.S. provisional application No. 60/116,641, filed Jan. 21, 1999.

BACKGROUND OF THE INVENTION

The art of music compression is based on psychoacoustic phenomena, e.g., the human hearing system and the human brain can not process certain acoustic information of lesser amplitudes in the presence of other information of higher amplitudes. It is well known that the recent rise in music piracy had its impetus on college campuses when students with fast Internet connections discovered that a sound compression technology called MP3 could pack copies of music that could be reproduced almost perfectly into a file small enough to distribute rapidly on line. These students, ripping songs from CDs, compressing them (typically, into approximately one-tenth their original size), and posting the files on the Web, proved that MP3 and other compression technologies could transform an industry and establish an entirely new way to distribute music whether acquired legitimately or not.

Downloading music is the process of copying a file from a site on the Internet to the user's hard drive. The commonly used term "streaming audio" refers to music that can be listened to as it arrives without necessarily being stored. (Presently, the most popular streaming format is RealAudio ®.) Downloaded music and streaming music are different—streaming music provides instant gratification but sometimes poor playback quality, and it does not necessarily capture the content. Downloading, which involves moving an entire file before any part of it is accessible, offers the potential for better quality over limited bandwidth networks and, fueling piracy and copyright concerns, deposits the content on a hard drive. However, as used herein, the term downloading refers to both. Already there is a new breed of "solid-state personal stereo," such as the Rio ® of Diamond Multimedia ® and the Nomad ® of Creative Labs ®, in which downloaded music is stored on RAM.

Artists and music companies would of course like to protect their music. That is extremely difficult. For example, once music is in analog form, which it must be if conventional speakers are used, it is very difficult to prevent unauthorized copying. And there is no practical way to prevent compressed music files from being distributed over the Internet, for example, by way of E-mail.

There is clearly a need for some kind of protection scheme for electronic music distribution (commonly referred to as EMD) that will protect artists and the music companies, at least partially, yet be accepted by the record-buying public and the consumer electronics companies. From a practical standpoint, the goal is not to prevent unauthorized music distribution in any form. The goal of the present invention is to prevent play or processing of pirated music (so that distribution of pirated copies over the Internet, which from a practical standpoint just cannot be prevented, achieves nothing of value). The present invention is also applicable to the distribution of audio/video files. In the appended claims, the term "music" is to be taken as embracing video and other forms of entertainment programming material as well.

SUMMARY OF THE INVENTION

In the long run, any protection scheme must have the cooperation of the consumer electronics manufacturers and it must be based on the rule of law. Thus, if the consumer electronics industry and the personal computer manufacturers agree that their music players and PCs will conform to standards that implement a copy-protection scheme such as that of the present invention, and there are laws—such as those that exist in the United States—that make it a crime to foil a player designed to protect against play of pirated music, then a copy-protection scheme can be effective. The present invention is designed to work with a player for downloaded (or other) music that operates in accordance with certain rules, the assumption being that the player operation will not be illegally modified under penalty of law.

Before considering the invention itself, it will be helpful to understand several different scenarios that can arise in electronic music distribution:

(1) The medium (CD, broadcast, etc,) over which a compressed file is received should not be ignored. If a compressed file is received over a secure channel, i.e., one whose very nature is an assurance that the file was most likely sent with authorization of the music rights holder, it is not unreasonable to assume that the file should be played. An example is that of a record company that sells music in compressed form over the Internet, from a Web site that encrypts the music file. The file can be used only if the recipient has the decryption key, and that usually happens only if a payment has been made for it. Thus there is little need to prevent play of a compressed file that arrives over a secure channel.

(2) Consider next music that is received via a communications medium such as the Internet, over a channel that is not secure, and is received in compressed form. One possibility is that the music was originally released on a CD or DVD and it was the rights holder's intent that the music not be copied. If it is now being received in compressed form over an insecure channel, it is certainly possible that the music is being received from an unauthorized source which compressed it and is now distributing it, perhaps for a fee and perhaps for free.

(3) On the other hand, there are many artists who freely distribute their music from Web sites in compressed form. Very often this is the only way for a group to make a name for itself. This legitimate compressed file must be distinguishable from the pirated compressed file of the previous case. There must be a way to prevent play in one case and allow it in the other, even when both files are received over an insecure channel.

(4) When music is released on a CD or DVD, it is in the form of linear PCM (pulse code modulation) or, in the case of DVD, it may have been losslessly compressed to pack the data more efficiently. We are assuming that the music is to be played on a player that operates on a bit stream, compressed or linear PCM. Music files, in analog or any digital form, can be compressed into an MP3, AC3 or some other standard lossy compressed format. If the test used by a player to accept or reject a file always approves of a file that has not been subjected to lossy compression, be it analog or digital, then to foil the system it would only be necessary to expand the file after it is first received in compressed form from an illegitimate source. So to be effective, a protection scheme must not approve a file for play or other processing simply because it is not compressed at the point in the chain at which the "piracy" test is applied.

In accordance with the principles of my invention, in one embodiment thereof, two watermarks or tags are inserted into the music by the music publisher. One watermark is robust. By this is meant that it will not be destroyed by compression. (Hereinafter, the term "compression" excludes compression that is lossless; as used hereinafter, "compression" results in some information loss.) The other watermark is weak—it is designed to be destroyed by compression. The robust mark tells the player that the music is protected ("this music is not authorized to be delivered in compressed form over an insecure channel"), i.e., if the music is found to have been compressed and it was delivered over an insecure channel, then it should not be played or otherwise processed.

The player includes circuitry (or works in conjunction with circuitry or a data processor) that may not only check the kind of channel over which the music file was received, but also can tell if the music was compressed by checking whether the second watermark, the weak one, is missing. If the weak watermark is missing in the presence of the strong watermark, it is an indication that at some time in the history of the received music file, the music was compressed.

The basic theory is that music that is derived from a compressed source over an insecure channel, and which the rights holder has explicitly marked as unauthorized for such distribution, should not be played. For play to be prevented, the music must have been compressed at some time during its life (even if it is now in linear PCM, i.e., uncompressed, or analog form), and it must have been received over an unknown or insecure channel. Of course, some music publishers want their music to be distributed in compressed form and they want it to be copied. They will omit the robust watermark. The robust watermark is an indication that the music is protected, that there are rules that govern copying. The rules themselves may be included in the watermark if it is complex (e.g., how many copies may be made, etc.), or the watermark may simply represent the simple rule that if the music is received over an insecure channel and it was at some time in its history compressed, then it should not be copied and/or played. If the weak watermark is missing, a sign that at some time in its history the music was compressed, then the music is not played. It can now be shown that this scheme satisfies each of the four cases considered above, as well as others.

(1) The first case is that of a music file in any form received over a secure channel, i.e., one whose very nature is an assurance that the file was most likely sent with authorization of the music publisher. Whether there are no watermarks, or one or two, such music is played.

(2) The next case is that of music whose publisher wants it to be protected, that is received via a communications medium such as the Internet, over a channel that is not secure, and is received in compressed form. The presence of the robust watermark is an indication that it was the publisher's intent that the music not be copied. If it is now being received in compressed form over an insecure channel without the weak watermark, i.e., the weak watermark was destroyed by compression, the music is not played. (In general, the robust watermark may contain an elaborate set of rules pertaining to use and copying, and the "no copying" example is just that—an example. The basic point is that the robust watermark in effect says that there are rules, explicit or implicit, that control use and copying. The "missing" weak watermark serves simply to establish that at some time in the past history of this particular piece of music, it was in compressed form.)

(3) On the other hand, those artists who freely distribute their music from Web sites in compressed form need have no fear that their music will not be playable. That music will not be published with the robust watermark. The absence of the robust watermark is a signal that the music can be played with no restrictions.

(4) The system can not be compromised by first decompressing a compressed file. If that is done, the weak watermark will still be missing and the music will not be played. In fact, even if the music is decompressed and converted to analog form, it will still not be played. The absence of the weak watermark (in the presence of the robust watermark) indicates that at some time in the past the music was compressed, and that is the test for whether the rules associated with the robust watermark are to be followed.

The system is not foolproof. There is no doubt, for example, that computer users will compress original CD music, and store and play it on their portable players such as the Diamond ® Rio ®. But the object of the invention is to prevent the broadcast or E-mailing of playable music over the Internet. From a practical standpoint, it takes too long to transmit an uncompressed music file by Email, so the transmission of uncompressed music files is not yet a serious threat. And if a protected (with a robust watermark) compressed file is transmitted, it will not be playable on conforming equipment because the weak watermark will have been destroyed during the compression.

Interestingly, much work has been done in developing robust watermarks that will not be destroyed during compression. See, for example, *Digital Copyright Protection*, by Peter Wayner, AP Professional, 1997. Any of the known watermarks (also called tags) may be used for the robust watermark of the invention. But the present invention also relies on a watermark that is precisely what up to now has been avoided—a code or signal that is destroyed by compression. (The whole purpose of a watermark is to survive compression so that the source of a pirated file can be determined by inspecting the watermark.) Many of the previously rejected watermarks may be used for this purpose. But it is also easy to construct new, deliberately weak watermarks.

Ideally, the weak watermark should be functionally related to the music being protected in order to prevent "spoofing." For example, consider a watermark that is a standard digital signature (an encrypted hash of some portion of the linear PCM music file) whose bits replace the least significant bits in some sequence of digital samples. (This replacement has almost no effect on the music itself.) At least some of these least significant bits are invariably irretrievably lost during compression. That the digital signature can not be authenticated is a sign that the file was compressed. Of course, any single bit error will also erroneously cause the player to think that the file was compressed (i.e., the weak watermark is missing) because it will not be possible to authenticate it. For this reason, many digital signatures can be repeatedly employed. If only one of 50 is authenticated, for example, it may be taken that there was no previous compression. (In such a case, the weak watermark of the invention can be thought of as one or more of the digital signatures, the weak watermark being destroyed only if all of the digital signatures are destroyed.)

It is of interest to note that the invention works only because standard forms of music compression do not work perfectly. Theoretically, if music is compressed perfectly, then there should be no remnant of anything that is not necessary for the music itself. The art of developing watermarks is to embed in a file a signal that remains in the file in spite of the compression. This signal is the robust watermark of the invention. (To develop a weak watermark that is destroyed by compression is easy.)

In its broadest form the invention does not require use of two separate watermarks. A single watermark may suffice to facilitate the detection of pirated music. The watermark must be such that it is altered by compression of the music in a detectable manner but a remnant of the watermark must still remain after compression. The reason for the double requirement is apparent. Compression must alter the watermark in a way that a player can tell that the music containing the watermark was compressed. Otherwise, there is no way to tell that the music was compressed. However, were compression to eliminate the watermark entirely, there would be no way for the player to tell that the music is to be protected at all. That is why, if only a single watermark is used, some remnant of the watermark must survive compression. Thus in its broadest form, the method of the invention facilitates the detection of pirated music by inserting watermark information in music that is to be protected against piracy, the watermark information withstanding compression to the extent that it remains detectable but is changed in a manner that remnants thereof are recognizable if the music is compressed.

In the absence of any indication that the music was originally protected, i.e., a robust watermark is absent or there is no remnant of any watermark, the player processes the music without any restrictions. Even if originally there was a watermark, the consumer is not penalized if there is none now—he/she is given the benefit of the doubt over whether the music file was originally protected and the protection was somehow circumvented, or the music file was released by the publisher with no restrictions on copying.

BRIEF DESCRIPTION OF THE DRAWINGS

Further objects, features and advantages of the invention will become apparent upon consideration of the following detailed description in conjunction with the drawing, in which.

DETAILED DESCRIPTION

Figure 1:
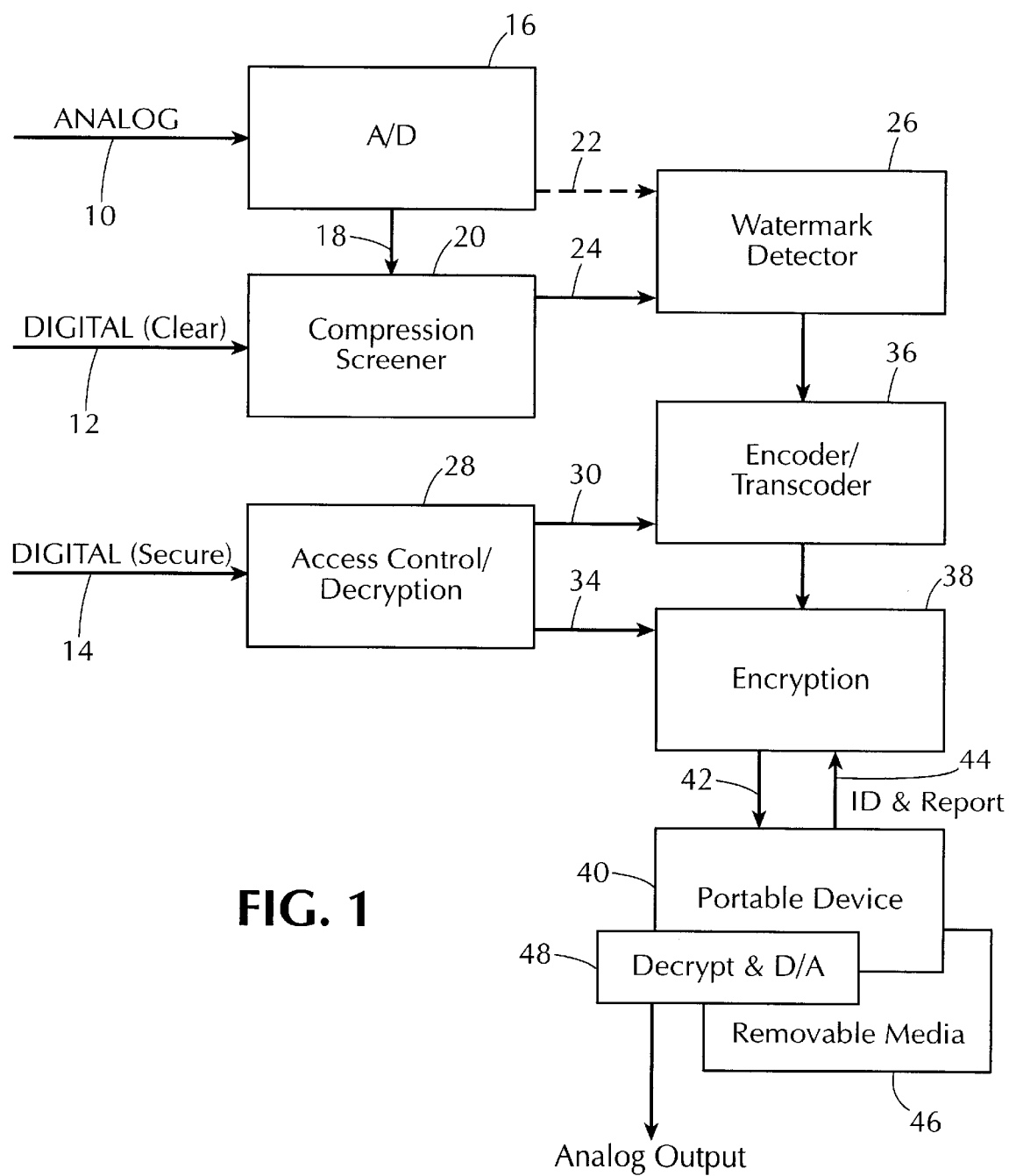
FIG. 1 depicts the illustrative embodiment of the invention, a copy protection control apparatus and method for facilitating the detection of pirated music.

The system of FIG. 1 can be self-contained, or part of a portable player or even a PC. The input is shown only schematically for the sake of clarity, in order to illustrate the three forms in which music may be received. The player is shown as a portable device 40 with some form of removable media 46. Elements 16–38 can be integrated into the portable player, or they can be part of a docking adapter or PC. Module 48 provides any necessary decryption and digital-to-analog conversion that may be required. The details of the player are not important to the present invention. Nor are the details of encryption module 38 important. This module passes encrypted music to the portable device 40 over bus 42 together with whatever rules apply. If the rules entail limiting the number of songs that can be recorded at any one time for use with the player (even with replaceable media) or the number of different media that can be used or the number of times that a particular piece of music can be recorded or played, then music reporting and media identification functions can be implemented, with the necessary data being transmitted on bus 44. Whatever rules (perhaps represented in the robust watermark) there are that govern the interfacing of the encryption module and the portable player are beyond the scope of the present invention. The present invention is concerned more with giving permission to the encryption module 38 to operate. The encryption module itself insures that screening has been completed before recording takes place in device 40. Device 40 records and plays encrypted files. It is the encryption that "binds" the content to the device, i.e., the device does not recognize files in the clear.

A digital signal received in the clear on line 12 is screened in module 20 for previous compression. (The term "in the clear" means that the signal is not encrypted—anything can be done with it in conformance with the watermarks.) This simply entails checking whether the weak watermark is missing. The signal is then passed to watermark detector 26 which looks for a robust watermark. If the weak watermark is present (there was no compression) together with the robust watermark, or if the robust watermark is missing (the copyright owner doesn't care about copying), then the signal is passed on to the encoder/transcoder 36. If the player requires an encoded signal, it is now encoded. If the signal is already encoded but the player requires a different form of encoding, then transcoding takes place. Module 36 is like module 38—it may be required in an actual implementation, but the present invention is more concerned with enabling operation of the module, not the details of its operation. (For example, the order in which the two watermarks are detected is not important.) The present invention deals with the filtering that precedes actual processing of the incoming signal.

Analog signals on line 10 are converted in analog-to-digital converter 16, and then passed to compression screener 20. In the case of an analog signal, both watermarks are used in the same way they are used when the incoming signal is digital. Play and copying are governed by the rules associated with the robust watermark, and play and copy authorizations may depend on whether there was previous compression. Even though the music is now in analog form, the presence of the weak watermark is still looked for in module 20. (Dashed arrow 22 is intended to show that the digitized signal can be passed directly to watermark detector 26, rather than first going to compression screener 20, provided that watermark detector 26 has the capability of checking for both watermarks and enforcing the system logic.)

Analog music and clear digital music are processed in similar ways. Whether the music is received in compressed or uncompressed form, it is inspected to determine whether it has ever been compressed. (The weak watermark may also be destroyed by A/D and D/A conversion if desired. The processing steps that destroy the weak watermark but which the robust watermark should survive depend on the particular media, players and expected data transformations of concern.) If the music comes in on an open, insecure channel and it was at some time compressed, and the robust watermark indicates that the copyright owner does care about what use is made of his material, then the music probably has not come from an authorized source. Conforming systems (40–48) can thus reject it and not allow recording of it, and perhaps not even play. It should be noted that the robust watermark must not only withstand compression, but also analog-to-digital conversion in module 16, and possible encoding in module 36 and digital-to-analog conversion in module 48.

Secure digital sources on line 14 are typically encrypted, and assumed to be legitimate. Access control/decryption module 28 determines whether the signal should be passed directly to encryption module 38, or whether it must first be processed by encoder/transcoder module 36. In either case, the music is recorded and played.

Figure 2:
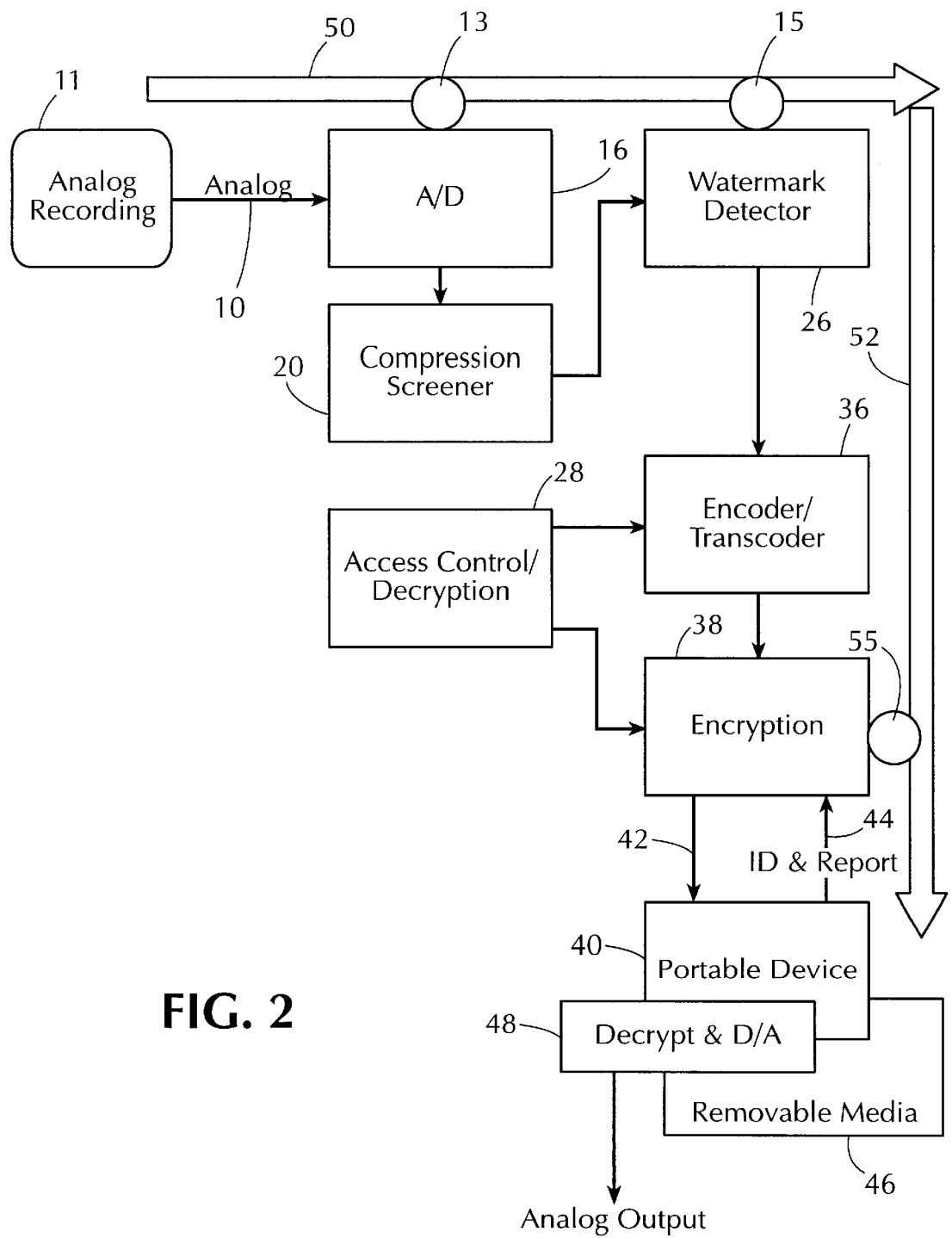
FIGS. 2–8, which are based on FIG. 1, depict the flow of the processing and the results obtained for particular cases of interest.

FIG. 2 is based on FIG. 1 but shows only those modules necessary to understand what happens when an analog recording with no watermarks is received. Arrows 50 and 52 show the processing flow. The little circles 13 and 15 that couple the arrows to individual modules are designed to show that these modules are important to the determination of what is done with the music.

The music is converted to digital form in module 16, and then watermark detector 26 determines that there is no robust watermark. The music is not copy-protected, and it is passed to the player as shown by arrow 52. (Little circle 55 is included in the drawing to show that other modules, such as module 38, function in their usual capacities.) There are no restrictions on what is done with the music.

Figure 3:
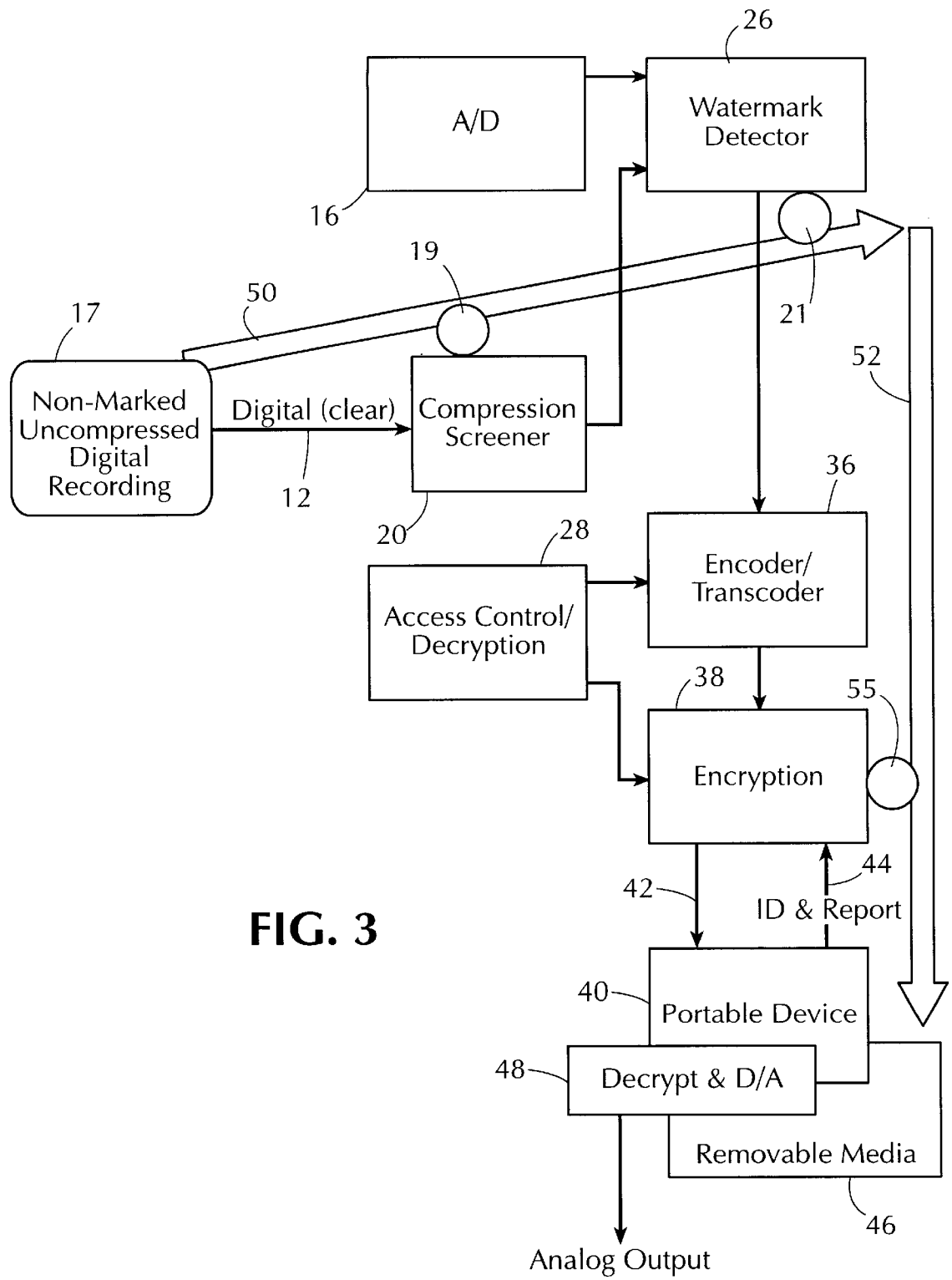

The case of FIG. 3 is similar in that the music is not marked (not copy-protected), i.e., there is no robust watermark, although in this case the music is in the form of a digital file. The form is that in which music typically appears on a present-day commercial CD, or even one that is personally recorded. The music is not compressed, and may never have been compressed. Nevertheless, when compression screener 20 determines (see little circle 19) that the weak watermark is missing (since it never existed in the first place), it treats the music as though it was at some time compressed. However, watermark detector 26 determines (see little circle 21) that the robust watermark is not present, i.e., there are no restrictions on use of the music. The music is passed to the player, again as symbolized by arrow 52.

Figure 4:
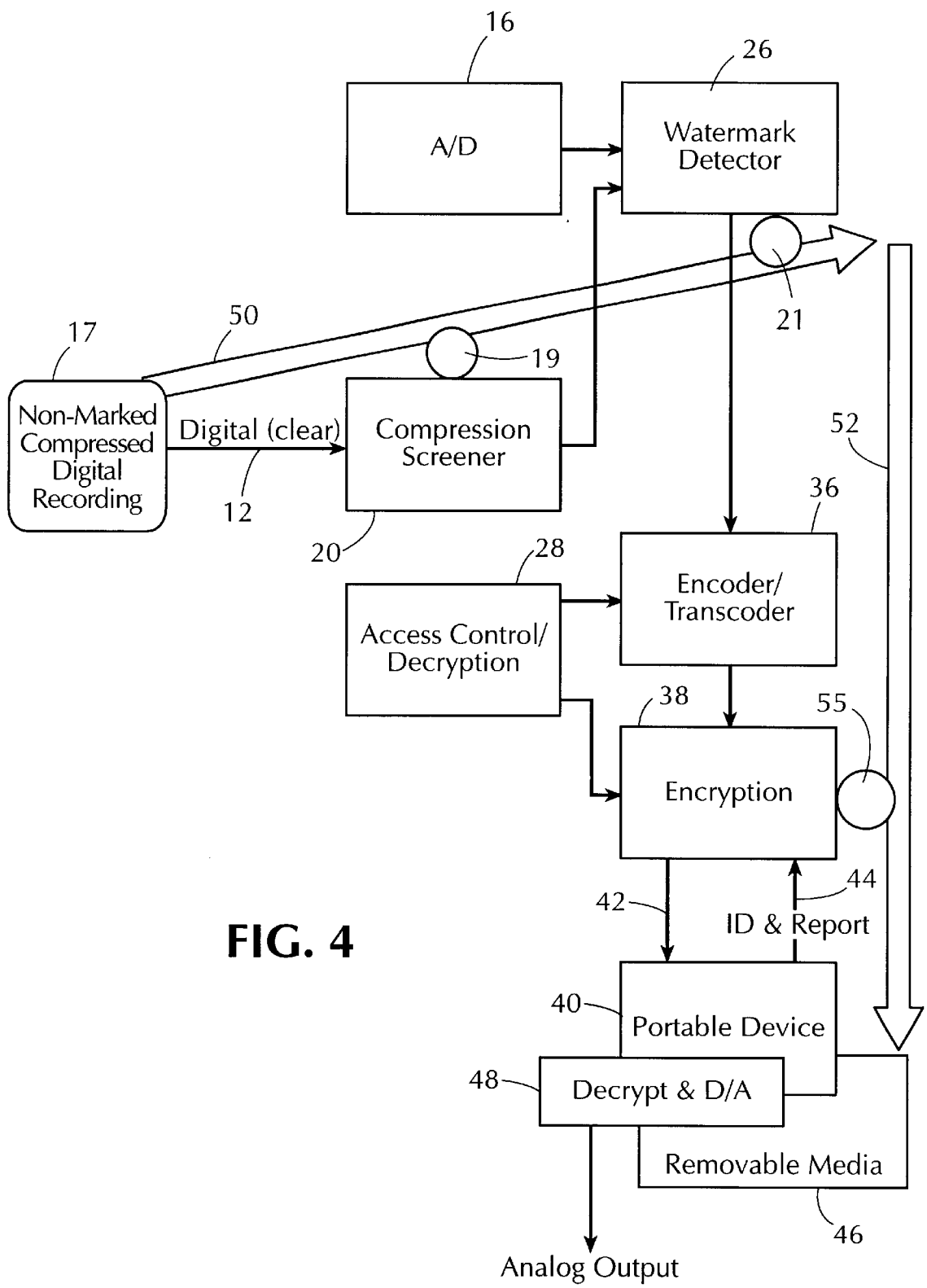

The processing in FIG. 4 is the same as that in FIG. 3. The only difference pertains to the form of the recorded music being processed. In FIG. 3 the music was not compressed. In FIG. 4, it is. It makes no difference because in the absence of the robust watermark, there is no restriction on the use made of the music.

Figure 5:
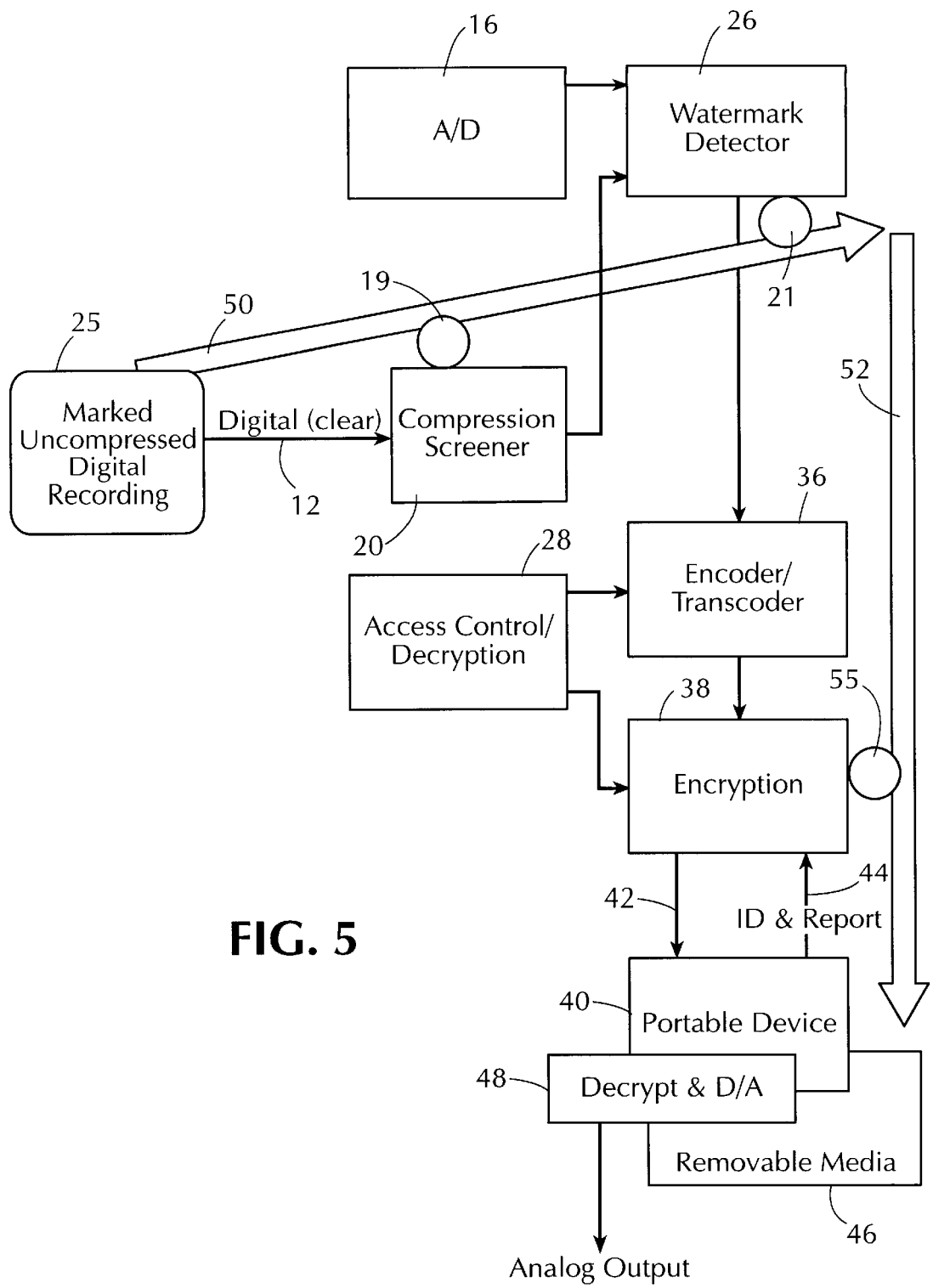

In FIG. 5 we have the case of marked music, music to be protected (with a robust watermark). But this music is not compressed, so there is to be no restriction on play or copying. Once again, the music is passed to the player with no restrictions.

Figure 6:
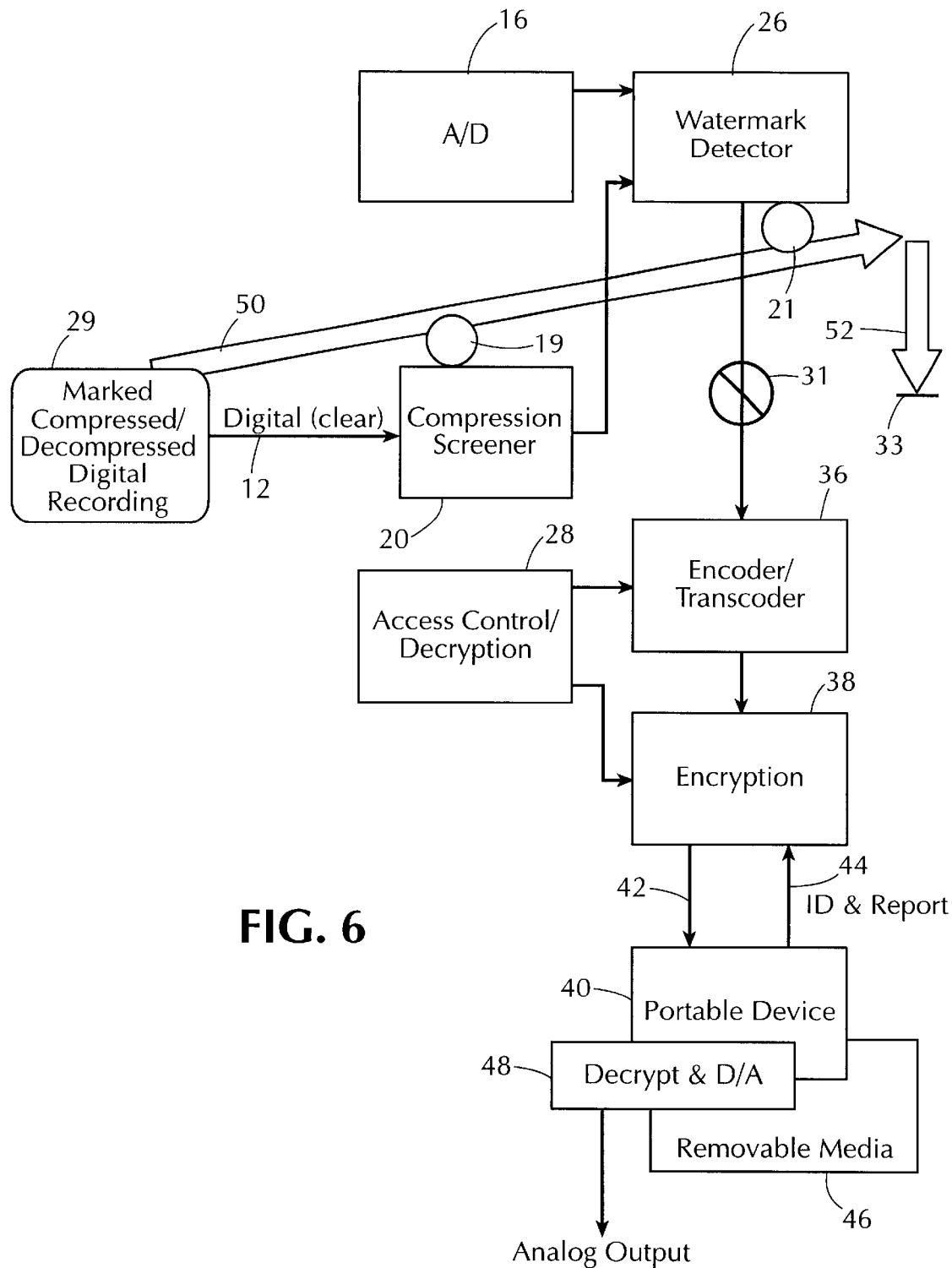

The music in FIG. 6 is derived from a CD or DVD disc. It is marked (with both watermarks), and has been compressed, and then decompressed and recorded (e.g., on CD-R or DAT). These two characteristics are determined by modules 20 and 26 (little circles 19 and 21), and it is this combination against which protection is sought—the music has come in over an insecure channel, it is protected, and it has been compressed and is therefore probably pirated. Arrow 52 is shown blocked at 33 to indicate that the music is not passed to the player.

Figure 7:
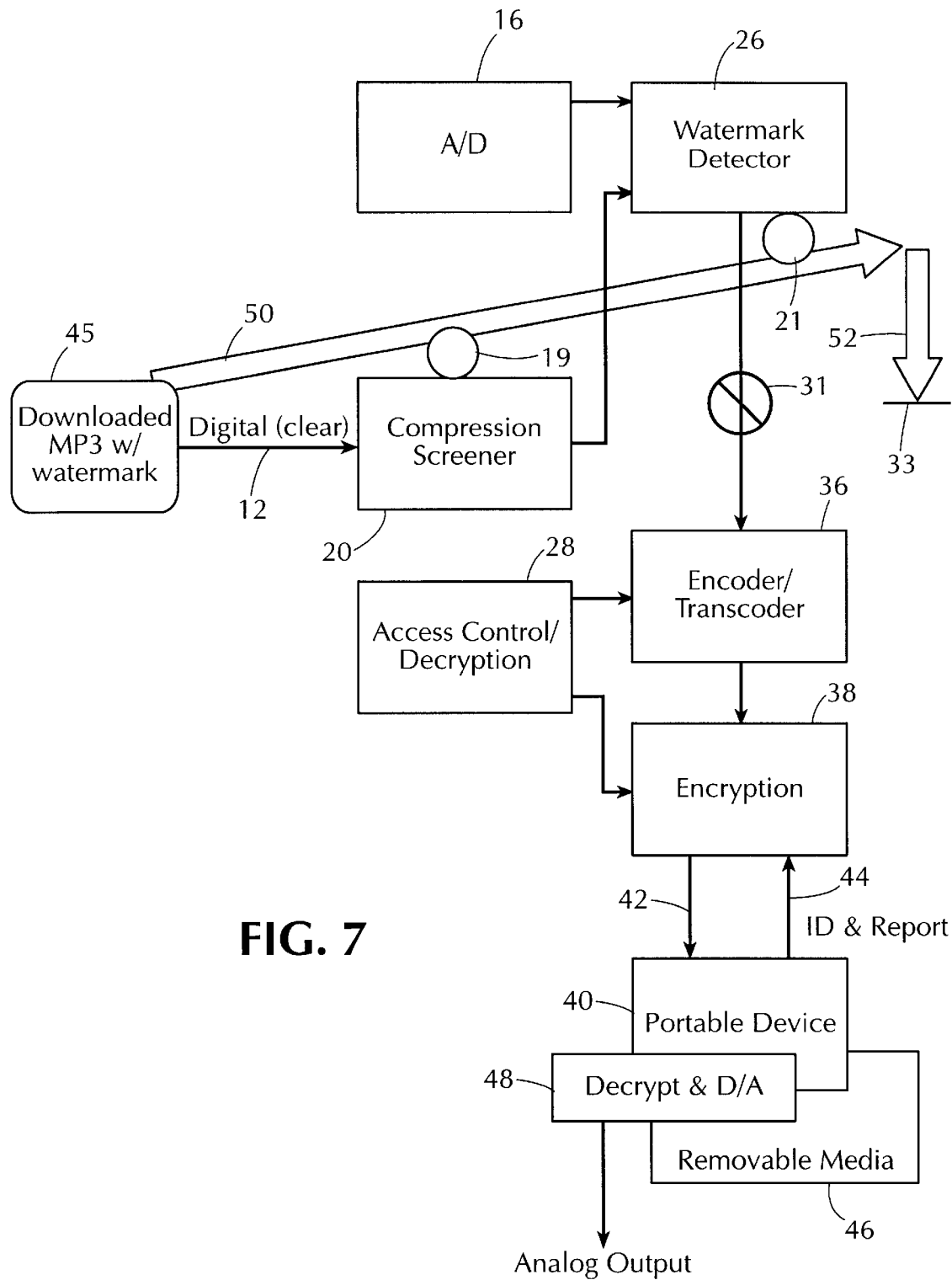

FIG. 7 is the same as FIG. 6, except that the music sources are different. In both cases, the music is marked (it has a robust watermark) so there are restrictions on play. The difference is that while in FIG. 6 the music is derived from a disc, in FIG. 7 the music is downloaded from a Web site, for example, in MP3 format. Because the compression did not destroy the robust watermark but did eliminate the weak watermark, the music is not played or otherwise processed.

Figure 8:
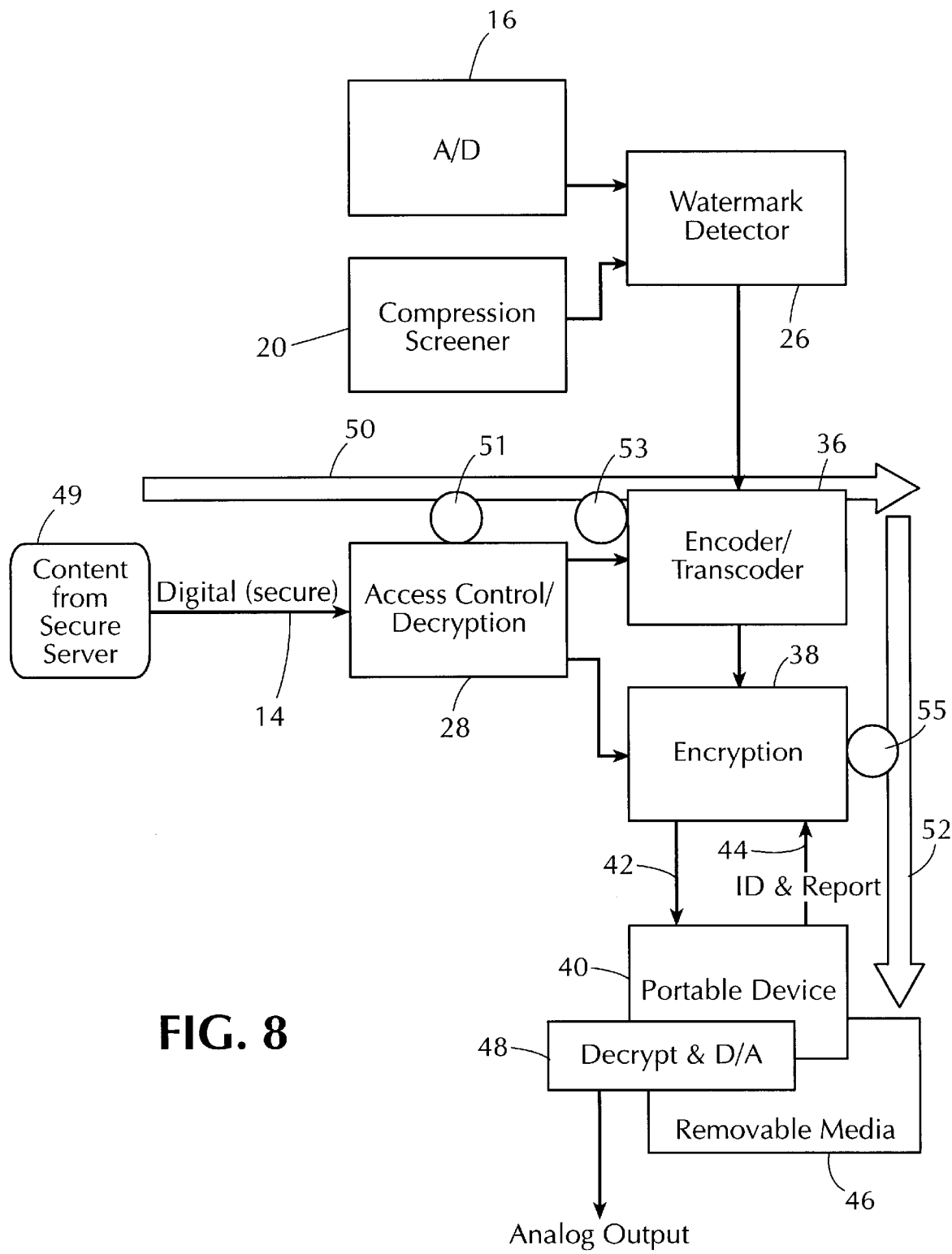

FIG. 8 depicts the last case, music derived over a secure channel. It does not matter in what form the music is received. If it comes in on a secure, authenticated channel, it is processed with no restrictions. Access control/decryption module 28 validates the signal and passes it to encoder/transcoder module 36, which in turn passes it to encryption module 38, the three operations being shown by little circles 51, 53 and 55. The signal does not even reach watermark detector 26 because whether the robust watermark is present is irrelevant—the music is treated as though that watermark is not present.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. A method for facilitating the detection of pirated music by inserting robust and weak watermarks in music that is to be protected against piracy, the robust watermark withstanding compression and the weak watermark being such that it will be destroyed if the music is compressed, and examining the music to detect which of the watermarks are present in order to determine the allowed use of the music.

2. A method in accordance with claim 1 wherein the robust watermark represents the permissible use to be made of the music in which it is contained.

3. A method in accordance with claim 1 wherein, if the music is received in the form of a digital file intended for storage on a computer or a portable player device, then the music file is examined for the presence of said robust and weak watermarks in order to determine what use restrictions if any are applicable to the file.

4. A method in accordance with claim 3 wherein in the absence of a robust watermark it is determined that there are no use restrictions applicable to the file.

5. A method in accordance with claim 4 wherein in the presence of a robust watermark and the absence of said weak watermark it may be determined that there are use restrictions applicable to the file.

6. A method in accordance with claim 5 wherein if said digital file is received over a secure channel, then regardless of which watermarks are present it is determined that there are no use restrictions applicable to the file.

7. A method in accordance with any of claims 3–6 wherein the determination of use restrictions that are applicable to said file is made independent of whether said file is received in compressed or uncompressed form.

8. A method in accordance with any of claims 3–6 wherein the determination of use restrictions that are applicable to said file is made independent of whether said file is received in analog or digital form.

9. A method for facilitating the detection of pirated music by inserting watermark information in music that is to be protected against piracy, the watermark information being such that it withstands compression to the extent that it remains detectable but is changed in a manner that remnants thereof are recognizable if the music is compressed, and examining the music to detect the extent to which the watermark information is present in order to determine the allowed use of the music, wherein in the presence of any remnants of said watermark information it may be determined that there are use restrictions applicable to the file, and if said digital file is received over a secure channel, then regardless of whether remnants of said watermark information are present it is determined that there are no use restrictions applicable to the file.

10. A method for restricting the processing of a received music file comprising the steps of examining the received music file for robust and weak watermarks that may have been inserted therein, the robust watermark withstanding compression and the weak watermark being such that it will be destroyed if the music containing it is compressed, and restricting processing of the received music file if the robust watermark is present and the weak watermark is not.

11. A method in accordance with claim 10 wherein the robust watermark represents the permissible use to be made of the music in which it is contained.

12. A method in accordance with claim 10 wherein, if the music is received in the form of a digital file intended for storage on a computer or a portable player device, then the music file is examined for the presence of said robust and weak watermarks in order to determine what use restrictions if any are applicable to the file.

13. A method in accordance with claim 12 wherein in the absence of a robust watermark it is determined that there are no use restrictions applicable to the file.

14. A method in accordance with claim 13 wherein if said digital file is received over a secure channel, then regardless of which watermarks are present it is determined that there are no use restrictions applicable to the file.

15. A method in accordance with claim 10 wherein if said digital file is received over a secure channel, then regardless of which watermarks are present it is determined that there are no use restrictions applicable to the file.

16. A method in accordance with any of claims 10–15 wherein a determination of use restrictions that are applicable to said file is made independent of whether said file is received in compressed or uncompressed form.

17. A method in accordance with any of claims 10–15 wherein a determination of use restrictions that are applicable to said file is made independent of whether said file is received in analog or digital form.

18. A method for restricting the processing of received music comprising the steps of examining the received music for a possible remnant watermark indicating that the music is to be protected against piracy, the original watermark in the music being such that it is altered by compression of the music in a manner that leaves a remnant of it detectable, and restricting processing of the received music if the remnant watermark is found, wherein if the music is received over a secure channel in the form of a digital file, then regardless of whether any remnant watermark is present it is determined that there are no use restrictions applicable to the file.

19. A player that restricts the processing of a received music file comprising a first module that examines the received music file for robust and weak watermarks that may have been inserted therein, the robust watermark withstanding compression and the weak watermark being such that it will be destroyed if the music containing it is compressed, and a second module that restricts processing of the received music file if the robust watermark is present and the weak watermark is not.

20. A player in accordance with claim 19 wherein the robust watermark represents the permissible use to be made of the music in which it is contained, and further including a third module that controls usage of the music file in accordance with said robust watermark.

21. A player in accordance with claim 20 wherein in the absence of a robust watermark it is determined that there are no use restrictions applicable to the file.

22. A player in accordance with claim 20 wherein if said music file is received over a secure channel, then regardless of which watermarks are present it is determined that there are no use restrictions applicable to the file.

23. A player in accordance with any of claims 20–22 wherein a determination of use restrictions that are applicable to said file is made independent of whether said file is received in compressed or uncompressed form.

24. A player in accordance with any of claims 20–22 wherein a determination of use restrictions that are applicable to said file is made independent of whether said file is received in analog or digital form.

25. A player that restricts the processing of received music comprising a module that examines the received music for a possible remnant watermark indicating that the music is to be protected against piracy, the original watermark in the music being such that it is altered by compression of the music in a manner that leaves a remnant of it detectable, and a module that restricts processing of the received music if the remnant watermark is found, wherein the remnant watermark represents the permissible use to be made of the received music in which it is contained, in the absence of said remnant watermark it is determined that there are no use restrictions applicable to the received music, and if the music is received over a secure channel in the form of a digital file, then regardless of whether said remnant watermark is present it is determined that there are no use restrictions applicable to the file.

* * * * *